(12) United States Patent
Rixman

(10) Patent No.: US 11,968,436 B2
(45) Date of Patent: Apr. 23, 2024

(54) LIGHT WEIGHT LENS BARREL SYSTEMS AND METHODS

(71) Applicant: Teledyne FLIR Commercial Systems, Inc., Goleta, CA (US)

(72) Inventor: Todd E. Rixman, Goleta, CA (US)

(73) Assignee: Teledyne FLIR Commercial Systems, Inc., Goleta, CA (US)

( * ) Notice: Subject to any disclaimer, the term of this patent is extended or adjusted under 35 U.S.C. 154(b) by 0 days.

(21) Appl. No.: 17/562,860

(22) Filed: Dec. 27, 2021

(65) Prior Publication Data

US 2022/0294942 A1    Sep. 15, 2022

Related U.S. Application Data

(60) Provisional application No. 63/133,208, filed on Dec. 31, 2020.

(51) Int. Cl.
| | |
|---|---|
| *G02B 7/02* | (2021.01) |
| *G02B 7/04* | (2021.01) |
| *G02B 13/14* | (2006.01) |
| *H04N 23/51* | (2023.01) |
| *H04N 23/55* | (2023.01) |
| *H04N 23/80* | (2023.01) |

(52) U.S. Cl.
CPC .............. *H04N 23/55* (2023.01); *G02B 7/021* (2013.01); *G02B 7/04* (2013.01); *G02B 13/14* (2013.01); *H04N 23/51* (2023.01); *H04N 23/80* (2023.01)

(58) Field of Classification Search
CPC .......... G02B 13/14; G02B 7/021; G02B 7/04; H04N 5/2252; H04N 5/2254; H04N 5/23229
See application file for complete search history.

(56) References Cited

U.S. PATENT DOCUMENTS

| | | | | |
|---|---|---|---|---|
| 2012/0092543 | A1* | 4/2012 | Afshari ................ | H04N 5/2251 349/200 |
| 2012/0140330 | A1* | 6/2012 | Nakayama ............ | G03B 17/04 359/601 |

FOREIGN PATENT DOCUMENTS

CN          102422627 A  *  4/2012   ........... G02B 13/004

* cited by examiner

*Primary Examiner* — Michael J Hess
*Assistant Examiner* — Naod W Belai
(74) *Attorney, Agent, or Firm* — Haynes and Boone, LLP

(57) ABSTRACT

Light weight lens barrel systems and methods are provided. In one example, an imaging device includes a lens barrel including a body and a plurality of focusing fins extending from the body. The imaging device further includes a lens system disposed within the lens barrel and configured to receive electromagnetic radiation and direct the electromagnetic radiation. The imaging device further includes a detector array including a plurality of detectors. Each of the plurality of detectors is configured to receive the electromagnetic radiation from the lens system and generate an image based on the electromagnetic radiation. Related methods and systems are also provided.

20 Claims, 17 Drawing Sheets

LIGHT WEIGHT LENS BARREL SYSTEMS AND METHODS

CROSS-REFERENCE TO RELATED APPLICATIONS

This application claims priority to and the benefit of U.S. Provisional Patent Application No. 63/133,208 filed Dec. 31, 2020 and entitled "LIGHT WEIGHT LENS BARREL SYSTEMS AND METHODS," and is related to U.S. Design patent application No. 29/764,756 filed Dec. 31, 2020 and entitled "CAMERA LENS BARREL," which are all incorporated herein by reference in their entirety.

STATEMENT REGARDING FEDERALLY SPONSORED RESEARCH OR DEVELOPMENT

This invention was made with Government support under W909MY-12-D-008 awarded by US Army RDECOM, CERDEC, NVESD. The Government has certain rights in this invention.

TECHNICAL FIELD

One or more embodiments relate generally to imaging systems and more particularly, for example, to light weight lens barrel systems and methods.

BACKGROUND

Imaging systems may include an array of detectors, with each detector functioning as a pixel to produce a portion of a two-dimensional image. In some cases, imaging systems may include one or more optical elements (e.g., lenses, mirrors) to facilitate imaging applications, such as by directing light to the array of detectors. There are a wide variety of image detectors, such as visible-light image detectors, infrared image detectors, or other types of image detectors that may be provided in an image detector array for capturing an image. As an example, a plurality of sensors may be provided in an image detector array to detect electromagnetic (EM) radiation at desired wavelengths. In some cases, such as for infrared imaging, readout of image data captured by the detectors may be performed in a time-multiplexed manner by a readout integrated circuit (ROIC). The image data that is read out may be communicated to other circuitry, such as for processing, storage, and/or display. In some cases, a combination of a detector array and an ROIC may be referred to as a focal plane array (FPA). Advances in process technology for FPAs and image processing have led to increased capabilities and sophistication of resulting imaging systems.

SUMMARY

In one or more embodiments, an imaging device includes a lens barrel including a body and a plurality of focusing fins extending from the body. The imaging device further includes a lens system disposed within the lens barrel and configured to receive electromagnetic radiation and direct the electromagnetic radiation. The imaging device further includes a detector array including a plurality of detectors. Each of the plurality of detectors is configured to receive the electromagnetic radiation from the lens system and generate an image based on the electromagnetic radiation.

In one or more embodiments, a method includes receiving, by a lens system disposed within a lens barrel that includes a body and a plurality of focusing fins extending from the body, electromagnetic radiation associated with a scene. The method further includes directing, by the lens system, the electromagnetic radiation to a detector array. The method further includes receiving, by the detector array, the electromagnetic radiation. The method further includes generating, by the detector array, an image based on the electromagnetic radiation.

The scope of the present disclosure is defined by the claims, which are incorporated into this section by reference. A more complete understanding of embodiments of the present disclosure will be afforded to those skilled in the art, as well as a realization of additional advantages thereof, by a consideration of the following detailed description of one or more embodiments. Reference will be made to the appended sheets of drawings that will first be described briefly.

Figure 1:
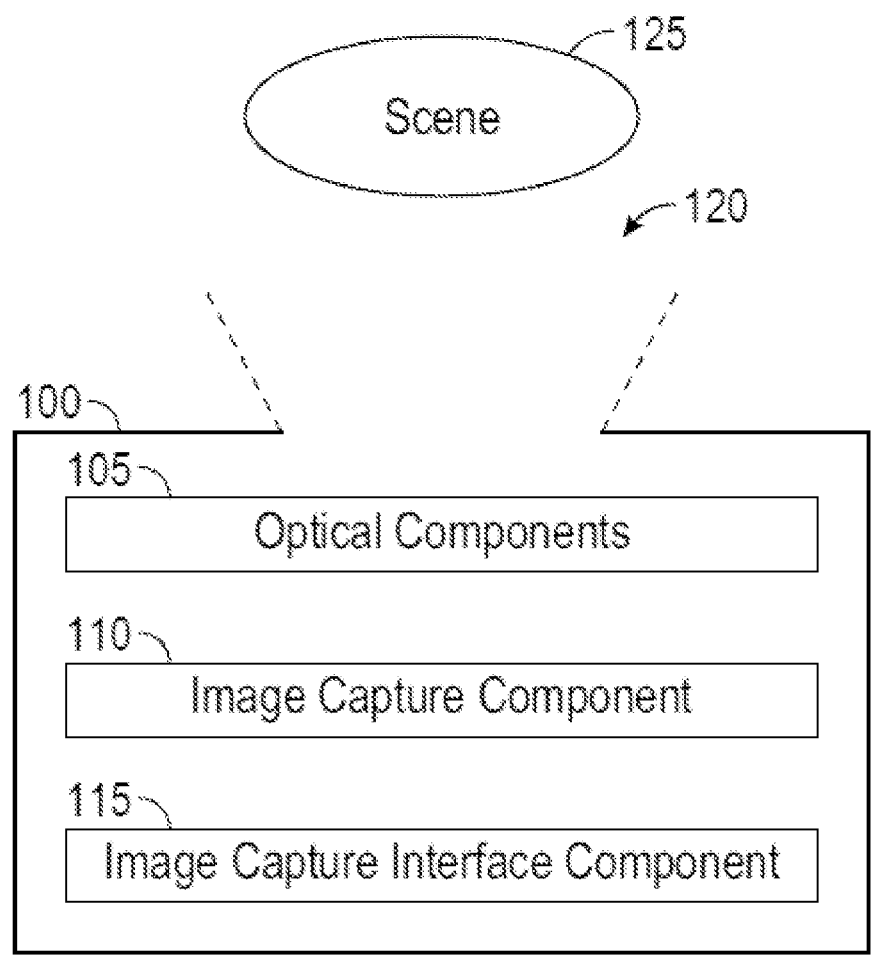
FIG. 1 illustrates a block diagram of an imaging device in accordance with one or more embodiments of the present disclosure.

Embodiments of the present disclosure and their advantages are best understood by referring to the detailed description that follows. It is noted that sizes of various components and distances between these components are not drawn to scale in the figures. It should be appreciated that like reference numerals are used to identify like elements illustrated in one or more of the figures.

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced using one or more embodiments. In one or more instances, structures and components are shown in block diagram form in order to avoid obscuring the concepts of the subject technology. One or more embodiments of the subject disclosure are illustrated by and/or described in connection with one or more figures and are set forth in the claims.

In one or more embodiments, light weight lens barrel systems and methods are provided. In some aspects, such systems and methods may be used for infrared imaging, such as thermal infrared imaging. Such imaging (e.g., infrared imaging) may be used for various applications, such as functional safety and vehicular (e.g., automotive) applications. In one embodiment, an imaging device includes a detector array, an optical element(s) to direct electromagnetic radiation associated with a scene to the detector array, and a lens barrel within which to dispose and hold/secure the optical element(s). In an aspect, the lens barrel may include a body and focusing fins extending from the body. The lens barrel may be formed of plastic material and/or light weight metal material (e.g., aluminum, magnesium). The imaging device may include a housing coupled to the lens barrel. The housing may include (e.g., enclose) the detector array. In some cases, the housing may include a processor to process image data from the detector array, memory to store raw image data and/or processed image data, a battery, and/or other components to facilitate operation of the imaging device. By way of non-limiting examples, an optical element may include a window, a lens, a mirror, a beamsplitter, a beam coupler, and/or other component. In an aspect, the imaging device includes a lens system including at least two lens elements. In some cases, the imaging device may also include other optical elements upstream of the lens elements, downstream of the lens elements, and/or interspersed between the lens elements and/or between two lens elements.

The detector array may receive electromagnetic radiation directed (e.g., projected, transmitted) by the lens element(s) onto the detector array. In this regard, the electromagnetic radiation may be considered image data. The detector array may generate an image based on the electromagnetic radiation. The lens element(s) and/or other optical element(s) of the imaging device may be transmissive of electromagnetic radiation within a waveband dependent on a desired application. In an aspect, the imaging device may be an infrared imaging device for facilitating capture of a waveband encompassing at least a portion of the thermal infrared spectrum, such as a mid-wave infrared spectrum and/or a long-wave infrared spectrum. In infrared imaging applications, the detector array may include an array of microbolometers and/or an array of other types of infrared detectors. As non-limiting examples, a lens element may include silicon, germanium, chalcogenide glass (e.g., $As_{40}Se_{60}$), germanium arsenide selenium (GeAsSe), $Ge_{22}As_{20}Se_{58}$, and/or $Ge_{33}As_{12}Se_5$. Lens material used to manufacture the lens element(s), respectively, are generally based on a desired application. For example, lens material may be selected to allow a desired transmission waveband of the lens elements.

In various applications, a light weight lens barrel with sufficient structural integrity may be desired. In various aspects, the focusing fins of the lens barrel may provide structural integrity to the lens barrel while helping to reduce an overall weight of the lens barrel relative to conventional lens barrels with top flanges with notches defined therein. In some cases, the focusing fins may be evenly distributed along a circumference of the body of the lens barrel. The number of focusing fins may be based on a desired balance of strength and weight and is generally application dependent. As one example, the imaging device with the light weight lens barrel may be mounted on a vehicle (e.g., an unmanned aerial vehicle), such as for a surveillance application.

Referring now to the drawings, FIG. 1 illustrates a block diagram of an example imaging device 100 in accordance with one or more embodiments of the present disclosure. In an embodiment, the imaging device 100 may be an infrared imaging device. The imaging device 100 may be used to capture and process image frames. The imaging device 100 includes optical components 105, an image capture component 110, and an image capture interface component 115.

The optical components 105 may receive electromagnetic radiation through an aperture 120 of the imaging device 100 and pass the electromagnetic radiation to the image capture component 110. For example, the optical components 105 may direct and/or focus electromagnetic radiation on the image capture component 110. The optical components 105 may include one or more windows, lenses, mirrors, beamsplitters, beam couplers, and/or other components. In an embodiment, the optical components 105 may include one or more chalcogenide lenses, such as lenses made of $As_{40}Se_{60}$, that allow for imaging in a wide infrared spectrum. Other materials, such as silicon, germanium, and GeAsSe, may be utilized. The optical components 105 may include components each formed of material and appropriately arranged according to desired transmission characteristics, such as desired transmission wavelengths and/or ray transfer matrix characteristics.

The image capture component 110 includes, in one embodiment, one or more sensors (e.g., visible-light sensor, infrared sensor, or other type of detector) for capturing image signals representative of an image of a scene 125. The image capture component 110 may capture (e.g., detect, sense) infrared radiation with wavelengths in the range from around 700 nm to around 1 mm, or portion thereof. For example, in some aspects, the image capture component 110 may include one or more sensors sensitive to (e.g., better detect) thermal infrared wavelengths, including mid-wave infrared (MWIR) radiation (e.g., EM radiation with wavelength of 2-7 μm) and/or LWIR radiation (e.g., electromagnetic radiation with wavelength of 7-14 μm). In one embodiment, the sensor(s) of the image capture component 110 may represent (e.g., convert) or facilitate representation of a captured thermal image signal of the scene 125 as digital data (e.g., via an analog-to-digital converter).

The image capture interface component 115 may receive image data captured at the image capture component 110 and may communicate the captured image data to other components or devices, such as via wired and/or wireless communication. In various embodiments, the imaging device 100 may capture image frames, for example, of the scene 125.

In some embodiments, the optical components 105, image capture component 110, and image capture interface component 115 may be housed in a protective enclosure. In one case, the protective enclosure may include a lens barrel (e.g., also referred to as a lens housing) that houses the optical components 105 and a housing that houses the image capture component 110 and/or the image capture interface component 115. In this case, the lens barrel may be coupled to the housing. In an aspect, the protective enclosure may be represented by the solid-line box in FIG. 1 having the aperture 120. For example, the aperture 120 may be an opening defined in the protective enclosure that allows electromagnetic radiation to reach the optical components 105. In some cases, the aperture 120 may be an aperture stop of the imaging device 100.

Each optical element (e.g., lens element) may include at least one mating feature (e.g., also referred to as a mounting feature). The lens barrel may have a corresponding mating feature(s) that couples to a mating feature(s) of the optical element(s) to receive and secure the optical element(s). In this regard, each mating feature of an optical element may couple to a corresponding mating feature of the lens barrel to couple the optical element to the lens barrel. In one example, a mating feature of an optical element may include a first surface and a second surface at an angle (e.g., 90° angle, obtuse angle, or acute angle) relative to the first surface, and a mating feature of a lens barrel may have corresponding surfaces to couple to the first and second surfaces. In another example, a mating feature of an optical element may include a pin portion, and a mating feature of a lens barrel may include a slot portion to receive the pin portion, and/or vice versa. More generally, a mating feature(s) of an optical element and a corresponding mating feature(s) of a lens barrel may be any structure (e.g., indentation, hole, pin, or other structure) that facilitates coupling of the optical element to the lens barrel.

In some cases, a mating feature of a lens element may be appropriate to facilitate rotation and/or other movement of the lens element. In some cases, a mating feature may be utilized to facilitate alignment of a lens element, such as via pattern recognition during molding, machining, and/or assembling. For example, one or more mating features on a surface of a lens element can be located (e.g., using pattern recognition to scan the surface) to facilitate machining of a different surface of the lens element according to a desired design. As another example, a mating feature(s) of a surface(s) of a first lens element and/or a mating feature(s) of a surface(s) of a second lens element may be utilized to facilitate alignment of the first lens element relative to the second lens element.

The imaging device 100 may represent any type of camera system which, for example, detects electromagnetic radiation (e.g., thermal radiation) and provides representative data (e.g., one or more still image frames or video image frames). For example, the imaging device 100 may be configured to detect visible light and/or infrared radiation and provide associated image data. In some cases, the imaging device 100 may include other components, such as a shutter, a heater, a temperature sensor (e.g., for measuring an absolute temperature of a component of the imaging device 100), a filter, a polarizer, and/or other component. For example, a shutter between a window and a lens may be used to facilitate image capture and calibration. For example, an integrated heater may be coupled to the barrel of the imaging device 100.

Figure 2A:
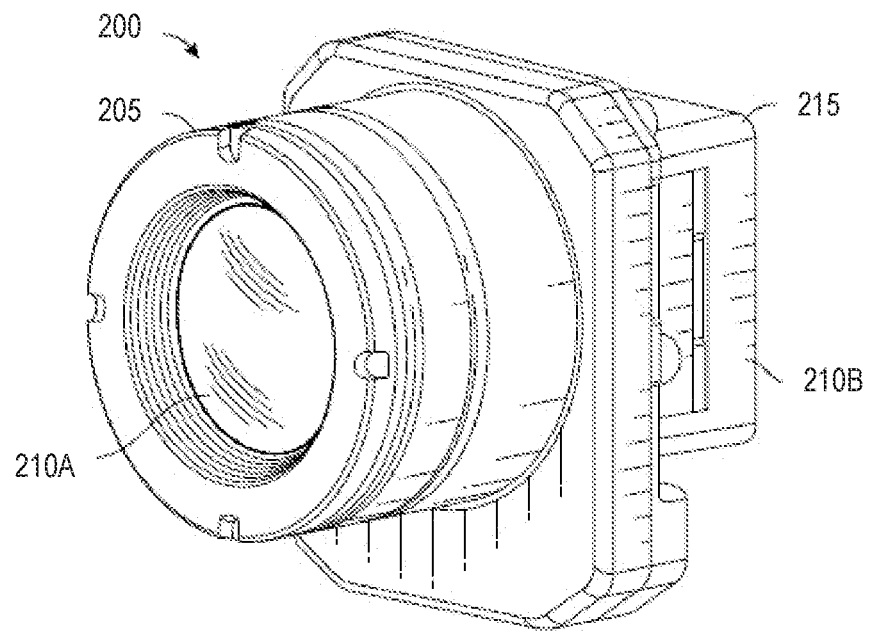
FIG. 2A illustrates a perspective view of an imaging device.

FIG. 2A illustrates a perspective view of an imaging device 200. As one example, the imaging device 200 may be a long-wave infrared thermal camera (e.g., for capturing electromagnetic radiation with wavelengths of 7-14 μm). In other cases, the imaging device 200 may be utilized to capture electromagnetic radiation within other wavelength ranges.

The imaging device 200 may include a lens barrel 205 configured to accommodate lens elements 210A and 210B. The imaging device 200 also may include an image capture portion 215 including an image capture component configured to capture images viewed through the lens barrel 205. In an aspect, the image capture portion 215 may include arrays of microbolometers configured to detect EM radiation. As one example, the arrays of microbolometers may be configured to detect long-wave infrared light of wavelengths between 7.5 μm and 13.5 μm. In an embodiment, the imaging device 200 may be the imaging device 100 of FIG. 1. In this embodiment, the optical components 105 of FIG. 1 may include the lens elements 210A and 210B, and the image capture component 110 of FIG. 1 may include the image capture portion 215.

Figure 2B:
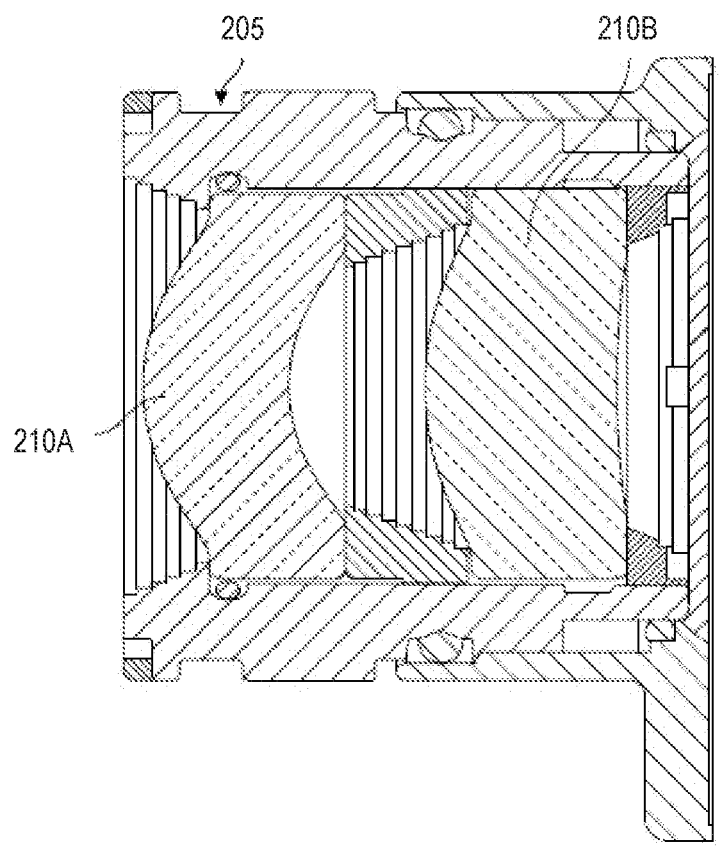
FIG. 2B illustrates a cross-sectional view of a lens barrel of an imaging device and components therein.

FIG. 2B illustrates a cross-sectional view of a lens barrel 200 of an imaging device and components therein. The imaging device also may include an image capture component that can capture images viewed through the lens barrel 200. As one example, the imaging device may be an LWIR thermal camera (e.g., for capturing electromagnetic radiation with wavelengths of 7-14 μm). In other cases, the imaging device may be utilized to capture electromagnetic radiation within other wavelength ranges.

The lens barrel 205 accommodates lens elements 210A and 210B. The lens elements 210A and 210B may coordinate to direct and focus light onto the image capture component. In some aspects, one or more coatings may be disposed on the lens elements 210A and/or 210B. By way of non-limiting examples, a coating may be an anti-reflective (AR) coating, a polarization coating, an impact-resistant coating, and/or other coating. It is noted that the lens element 210A and/or 210B may be of a different shape from that shown in FIG. 2B.

In one embodiment, the image capture component may include arrays of microbolometers to detect electromagnetic radiation. As one example, the arrays of microbolometers may be configured to detect long-wave infrared light of wavelengths between 7.5 μm and 13.5 μm. One or both of the lens elements 210A and 210B may be lenses that transmit a wide spectrum of infrared light, such as chalcogenide lenses.

Figure 3:
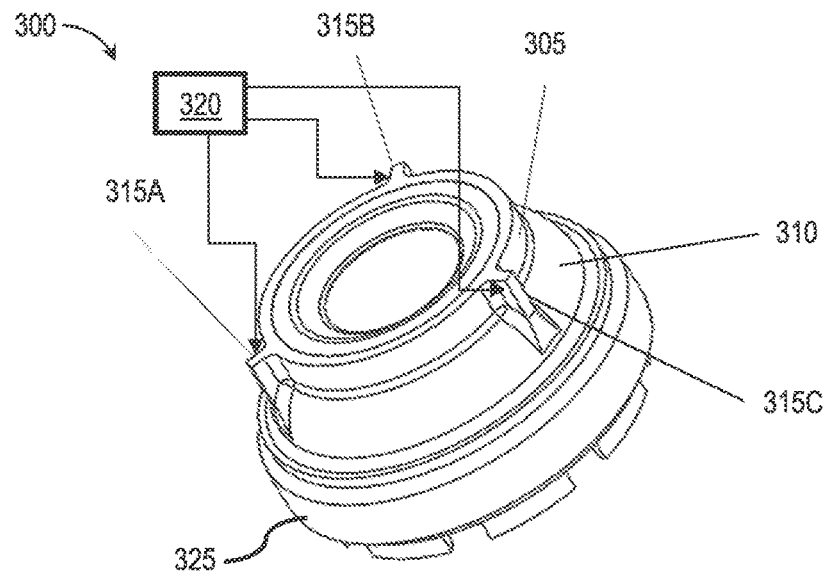
FIG. 3 illustrates a perspective view of a lens barrel of an imaging device in accordance with one or more embodiments of the present disclosure.

FIG. 3 illustrates a perspective view of a lens barrel 300 of an imaging device in accordance with one or more embodiments of the present disclosure. The lens barrel 300 includes body portions 305 and 310, focusing fins 315A, 315B, and 315C extending from the body portions 305 and 310, and an interface portion 325. In some cases, the body of the lens barrel 300 may include the body portions 305 and 310 and the interface portion 325. The lens barrel 300 (e.g., the body portions 305 and/or 310) includes a structure(s) to hold/secure (e.g., fixedly secure, movably secure) optical elements, such as lens elements. For example, in FIG. 3, the body portions 305 and 310 each have a circular aperture to receive optical elements. Apertures of other shapes, such as rectangular, may be used. In some cases, the optical elements may be disposed in the body portion 310. For example, as shown in FIG. 3, the body portion 310 may be wider than the body portion 305 to accommodate the optical elements. The lens barrel 300 may allow optical components disposed therein to maintain axial position and/or air gap between them. In some cases, a portion (e.g., bottom portion such as the interface portion 325) of the lens barrel 300 may be threaded to mate with a threaded portion of a housing of the imaging device. Such threading may facilitate focusing of the optical elements relative to a focal plane array. The lens barrel 300 may be formed of plastic material and/or light weight metal material (e.g., aluminum, magnesium).

The focusing fins 315A-C may be distributed along a circumference of the body portions 305 and 310. In some cases, the focusing fins 315A-C may be evenly distributed along the circumference, such that the focusing fins 315A-C are around 120° apart from each other. A top portion of the focusing fins 315A-C adjacent to the body portion 305 may have a smaller width than a bottom portion of the focusing fins 315A-C adjacent to the body portion 310. The top portion and the bottom portion of the focusing fins 315A-C may have a height that is the same or substantially the same as a height of the body portion 305 and the body portion 310, respectively. Relative to conventional lens barrels in which a top flange of the lens barrels has notches defined therein to facilitate focusing, the lens barrel 300 with the focusing fins 315A-C may have less overall volume of material in the lens barrel 300 (e.g., less material for the top flange than conventional lens barrels) and thus less weight than conventional lens barrels. In this regard, physical characteristics associated with the body portions 305 and 310 and the focusing fins 315A-C, such as their dimensions and arrangement, may be appropriate to provide structural integrity (e.g., mechanical strength, stiffness) to the lens barrel 300 while allowing the lens barrel 300 to be light (e.g., relative to conventional lens barrels with top flanges with notches defined therein).

During focusing, the focusing fins 315A-C may engage with a tool 320 (e.g., a focusing torque tool). The tool 320 may have complementary (e.g., opposite polarity) features to mate with the focusing fins 315A-C. The body portion 305, the body portion 310, and/or the focusing fins 315A-C may be formed integrally (e.g., as a single piece) or as separate pieces that are then coupled together (e.g., using adhesives, engagement features, etc.). Although FIG. 3 illustrates an example lens barrel with three focusing fins evenly distributed along the circumference of the lens barrel 300, a lens barrel may include fewer, more, and/or differently arranged focusing fins that those shown for the lens barrel 300. The number of focusing fins may be based on a desired balance of strength and weight and is generally application dependent.

Figure 4:
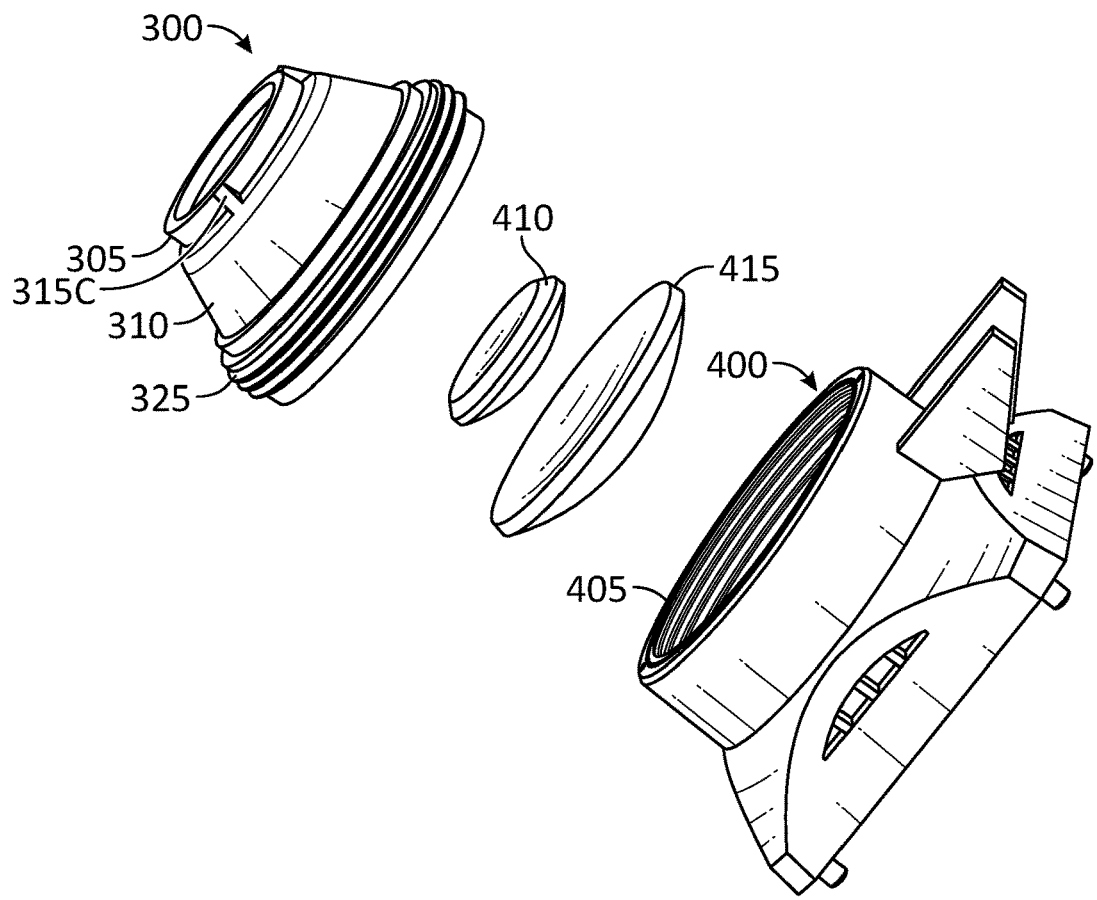
FIG. 4 illustrates an exploded view showing a lens barrel, a housing, and lens elements in accordance with one or more embodiments of the present disclosure.

FIG. 4 illustrates an exploded view showing the lens barrel 300, a housing 400, and lens elements 410 and 415 in accordance with one or more embodiments of the present disclosure. The body portion 310 is threaded to mate with a threaded portion of the housing 400. In this regard, the interface portion 325 may be received in an aperture 405 of the housing 400. The lens elements 410 and/or 415 may be partially disposed within the lens barrel 300 and/or the housing 400. In one example, the lens element 410 may be disposed within the body portion 310 and the lens element 415 may be disposed within downstream of the lens barrel 300 when the lens barrel 300 is mated to the housing 400. In some cases, a detector array (e.g., an FPA), not shown in FIG. 4, may be disposed at least partially within or downstream of the housing 400.

Figure 5:
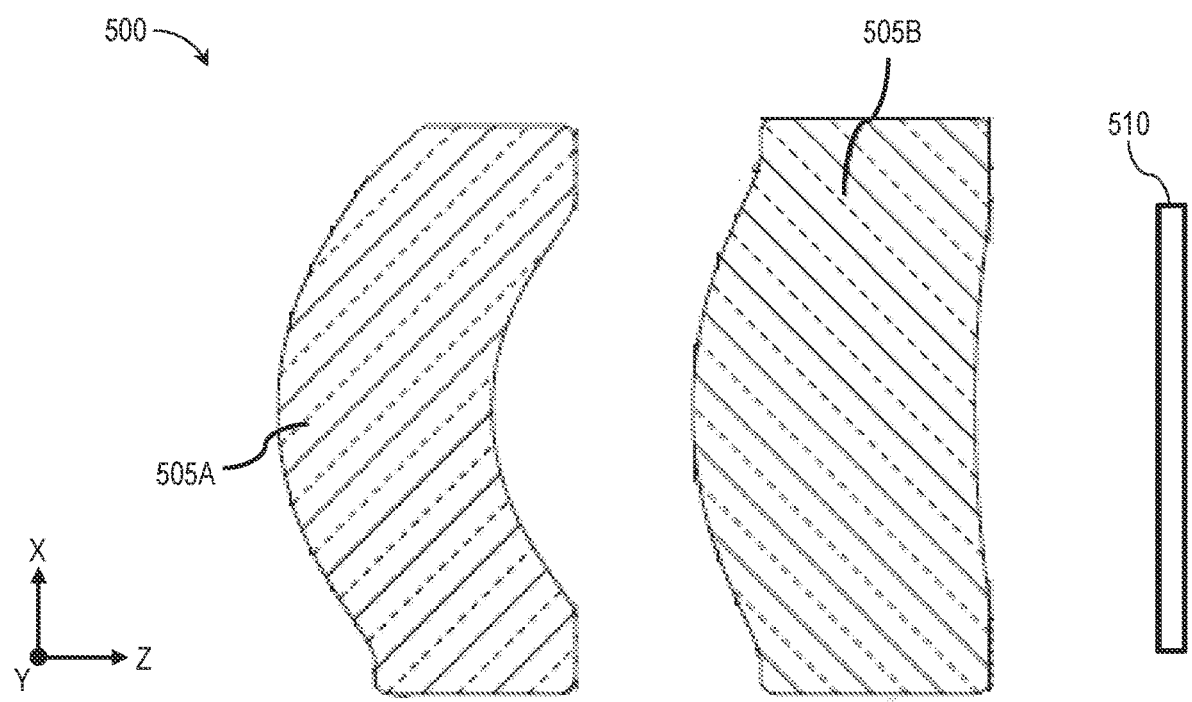
FIG. 5 illustrates a cross-sectional view of an optical system in accordance with one or more embodiments of the present disclosure.

FIG. 5 illustrates a cross-sectional view of an optical system 500 in accordance with one or more embodiments of the present disclosure. The optical system 500 is oriented along three orthogonal directions, denoted as X, Y, and Z. The X-direction and the Y-direction may be referred to as the horizontal direction and the vertical direction, respectively. In particular, FIG. 5 illustrates a cross-sectional view of the optical system 500 in the XZ-plane. The optical system 500 includes lens elements 505A and 505B and a detector array 510. In an aspect, the lens element 505A and/or 505B may be made of chalcogenide glass (e.g., IG6 chalcogenide glass). In an embodiment, the optical components 105 of FIG. 1 may include the lens elements 505A and 505B, and the image capture component 110 of FIG. 1 may include the detector array 510. In an embodiment, the lens element 505A and 505B may be the lens element 410 and 415, respectively, of FIG. 4. In some aspects, one or more coatings may be disposed on the lens elements 505A and/or 505B. By way of non-limiting examples, a coating may be an anti-reflective (AR) coating, a polarization coating, an impact-resistant coating, and/or other coating.

The lens element 505A receives electromagnetic radiation and directs the received electromagnetic radiation to the lens element 505B. The lens element 505B receives the electromagnetic radiation from the lens element 505A and directs the electromagnetic radiation received from the lens element 505B to the detector array 510. As such, the lens elements 505A and 505B collectively project the scene onto the detector array 510. Examples of materials of the lens elements 505A and 505B may include $As_{40}Se_{60}$, $Ge_{22}As_{20}Se_{58}$, $Ge_{33}As_{12}Se_5$, germanium, and silicon. An example range of a central lens thickness of the lens elements 505A and 505B is around 1 mm to around 15 mm. The detector array 510 receives the electromagnetic radiation and generates an image based on the electromagnetic radiation. In an aspect, the image may be processed using processing circuitry downstream of the detector array 510. As non-limiting examples, the detector array 510 may have a size of 640× 512 sensors (e.g., 640×512 array of microbolometers), 320× 256 sensors, and 1280×1024 sensors.

In an embodiment, to facilitate alignment of a horizontal field of view with the horizontal direction of the detector array 510 and a vertical field of view with the vertical direction of the detector array 510, one or both of the lens elements 505A and 505B can be moved relative to the detector array 510. In some aspects, the lens elements 505A and/or 505B may be moved via sliding motion (e.g., translational motion) to facilitate focusing, such as by using one or more actuators coupled to the lens elements 505A and/or 505B. In one case, the sliding motion may be along the Z-axis (e.g., the direction perpendicular to a focal plane) while preserving a fixed angular orientation. In these aspects, a focusing mechanism of the lens elements 505A and/or 505B may include components (e.g., actuators) for moving the lens elements 505A and/or 505B. In one case, a rotation about the Z-axis may be constrained within an alignment tolerance between the major FOV associated with the lens elements 505A and 505B and the corresponding major dimension (e.g., X-dimension) of the detector array 510 and/or constrained within an alignment tolerance between the minor FOV associated with the lens elements 505A and 505B and the minor dimension (e.g., Y-dimension) of the detector array 510. In some aspects, one or more lenses may be focused by rotating the lens(es) inside a threaded housing. In some aspects, the housing is not threaded. The housing may allow a linear slip-fit type arrangement rather than a threaded-in type arrangement, in which the lens elements 505A and 505B may be pushed into the housing and maintained in place using at least friction. Alternatively, some gap may be provided between the barrel and housing to allow for active alignment of the optics to the detector array 510 which is fixed in place by epoxy or other suitable adhesive.

In an aspect, a window may be disposed in front of the lens elements 505A and 505B and may selectively pass electromagnetic radiation of a scene toward the lens elements 505A and 505B. In some cases, the window may be a protective window placed in front of the lens elements 505A and 505B to protect the lens elements 505A and 505B and/or other components from environmental damage, mechanical damage, and/or other damage. Physical properties (e.g., material composition, thickness and/or other dimensions, etc.) of the window may be determined based on a waveband(s) desired to be transmitted through the window. In some cases, the window may be used to provide filtering, polarization, and/or other optical effects in addition to protection. In some cases, one or more coatings (e.g., polarization coating, AR coating, impact-resistant coating) may be disposed on the window to provide the filtering, polarization, protection, and/or other effects.

Figure 6:
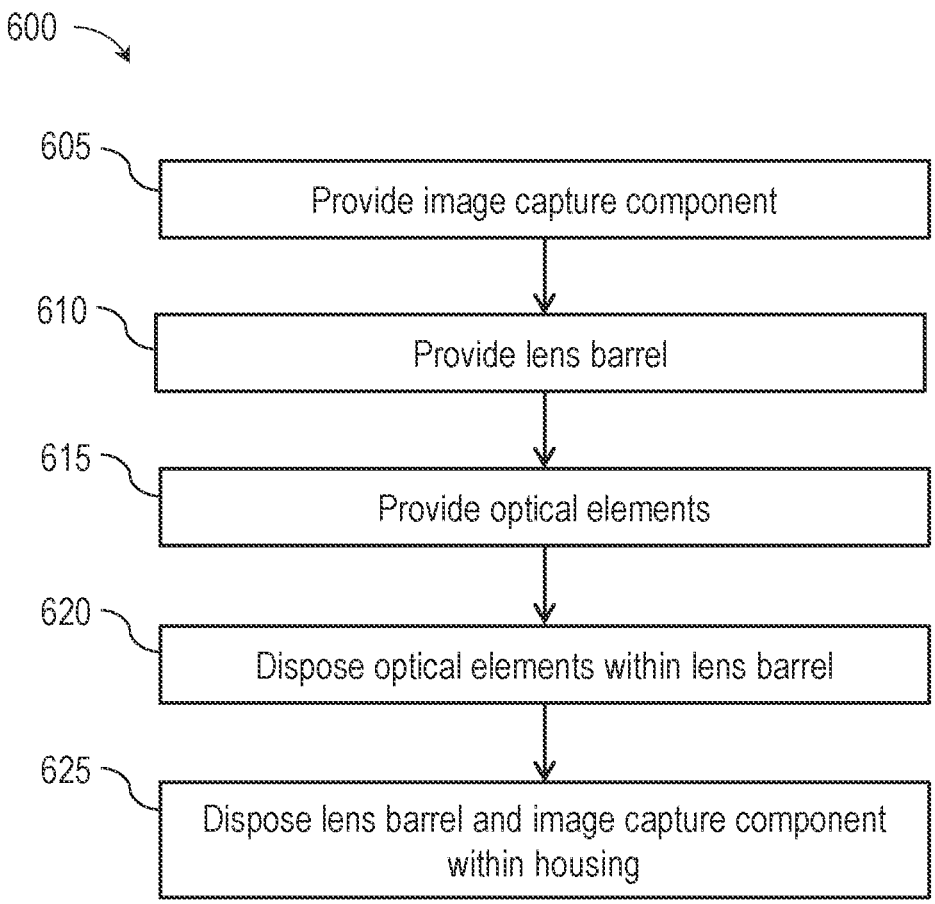
FIG. 6 illustrates a flow diagram of an example process for manufacturing an imaging device in accordance with one or more embodiments of the present disclosure.

FIG. 6 illustrates a flow diagram of an example process 600 for manufacturing an imaging device in accordance with one or more embodiments of the present disclosure. For explanatory purposes, the example process 600 is primarily described herein with reference to components of FIGS. 1 and 5 and associated arrangement of these components. However, the example process 600 is not limited to the components of FIGS. 1 and 5.

At block 605, the image capture component 110 is provided. At block 610, a lens barrel (e.g., 300 of FIG. 3) is provided. The lens barrel may include a body with focusing fins extending therefrom. In some cases, the lens barrel may be provided by forming the lens barrel through injection molding and/or machining. The body and the focusing fins may be formed integrally (e.g., as a single piece) or as separate pieces that are then coupled together (e.g., using adhesives, engagement features, etc.). At block 615, the optical components 105 are provided. In some cases, the optical components 105 may be formed. The optical components 105 may include one or more windows and/or one or more lens elements. For infrared applications, the optical components 105 (e.g., the lens elements 505A and 505B) may be formed from material that is transmissive in the 2-7 μm and/or 7-14 μm wavebands. At block 620, the optical components 105 are at least partially disposed within the lens barrel. In some aspects, each of the optical components may have mating features to couple to corresponding mating features of the lens barrel. In some cases, a tool (e.g., the tool 320) may be used to engage with the focusing fins of the lens barrel and facilitate disposing of the optical components 105 in the lens barrel. At block 625, the image capture component 110 and the lens barrel are disposed at least partially within a housing of the imaging device 100.

In one case, the lens elements 505A and 505B may be produced using wafer-level techniques. In such a case, transmissive crystalline material, such as germanium or silicon by way of non-limiting examples, may first be prepared in a wafer form. An array of lens elements (e.g., identical lens elements) may be diamond turned on one or two sides of the wafer. Machining of the array of lens elements may be on one or two sides of a wafer. In some cases, one or more mating features on a surface of a lens element can be located (e.g., using pattern recognition to scan the surface) to facilitate machining of a different surface of the lens element according to a desired design (e.g., freeform surface design). Lens elements formed as part of a wafer-level procedure may then be singulated to obtain individual lens elements that can be disposed in imaging devices. In a case that the lens elements 505A and 505B are different, the lens elements 505A and 505B may be formed as part of one wafer-level procedure (e.g., a wafer-level procedure that can be used to obtain differently shaped and/or sized lens elements) or two separate wafer-level procedures.

In one case, the lens elements 505A and 505B may be made of amorphous material. Examples of the material may include $As_{40}Se_{60}$ and GeAsSe glass. In some cases, the lens elements 505A and 505B may be diamond turned from disk-like preforms, diamond turned from near to shape ground preforms, molded from spherical performs, or molded from disk-like preforms using precision glass molding (PGM) technique. In some cases, an array of lenses can be molded simultaneously on a disk of glass.

Figure 7:
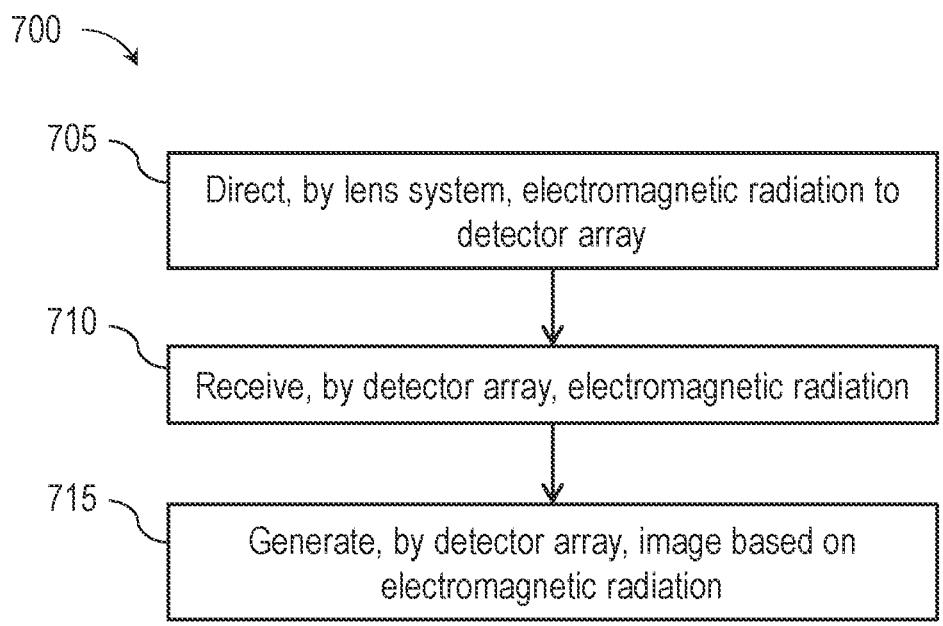
FIG. 7 illustrates a flow diagram of an example process for using an imaging device in accordance with one or more embodiments of the present disclosure.
Figure 8:
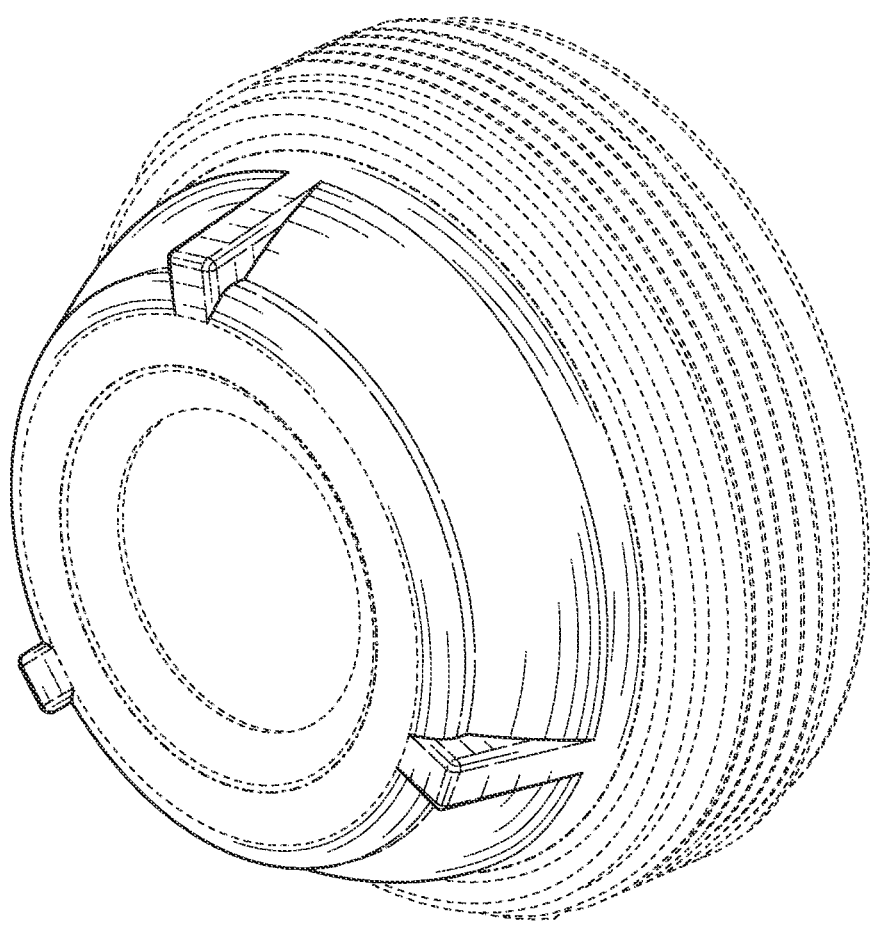
FIG. 8 illustrates a front, left, and top perspective view of a camera lens barrel in accordance with one or more embodiments of the present disclosure.
Figure 9:
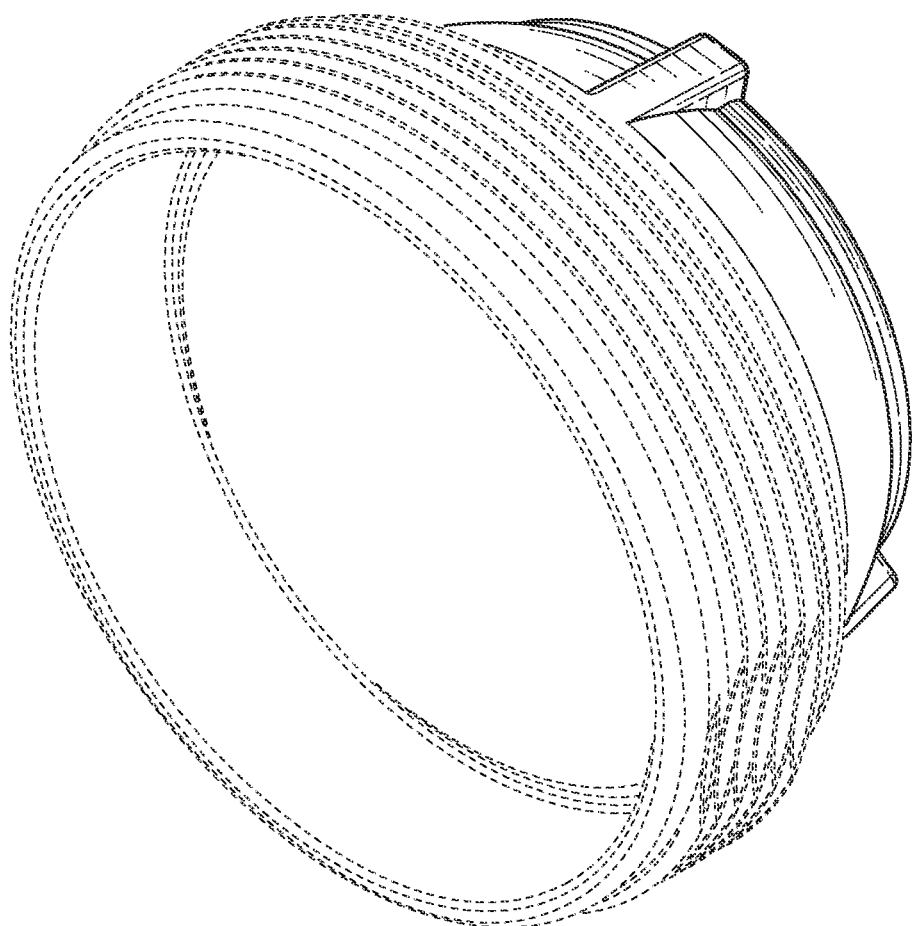
FIG. 9 is a rear, right, and top perspective view of a camera lens barrel in accordance with one or more embodiments of the present disclosure.
Figure 10:
FIG. 10 is a right side elevational view of a camera lens barrel in accordance with one or more embodiments of the present disclosure.
Figure 11:
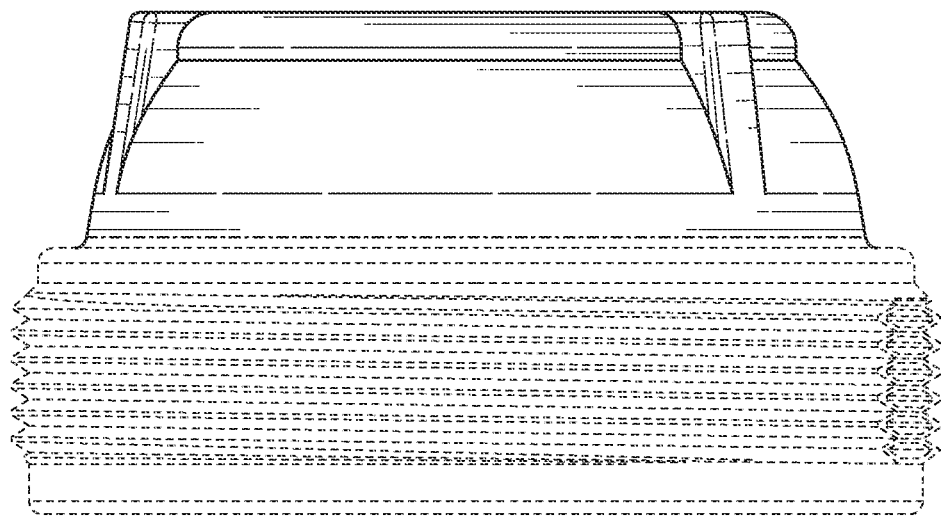
FIG. 11 is a left side elevational view of a camera lens barrel in accordance with one or more embodiments of the present disclosure.
Figure 12:
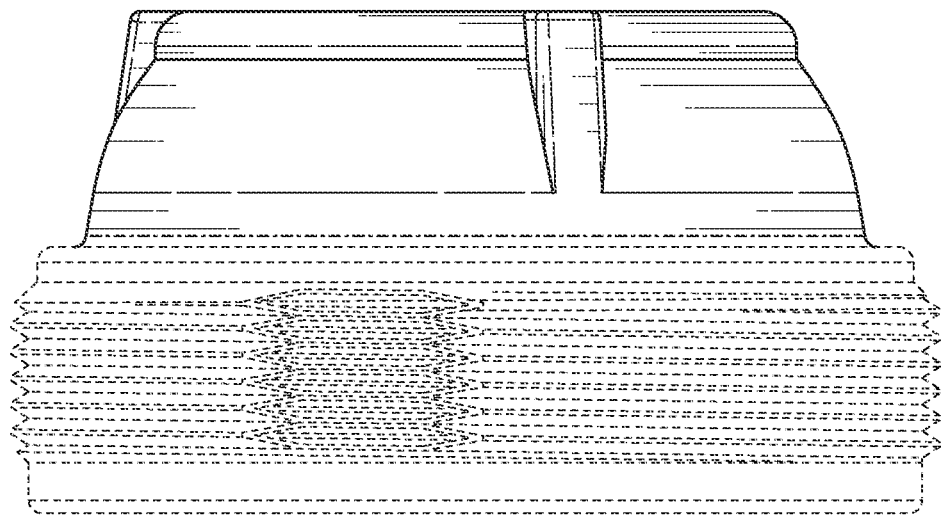
FIG. 12 is a top plan view of a camera lens barrel in accordance with one or more embodiments of the present disclosure.
Figure 13:
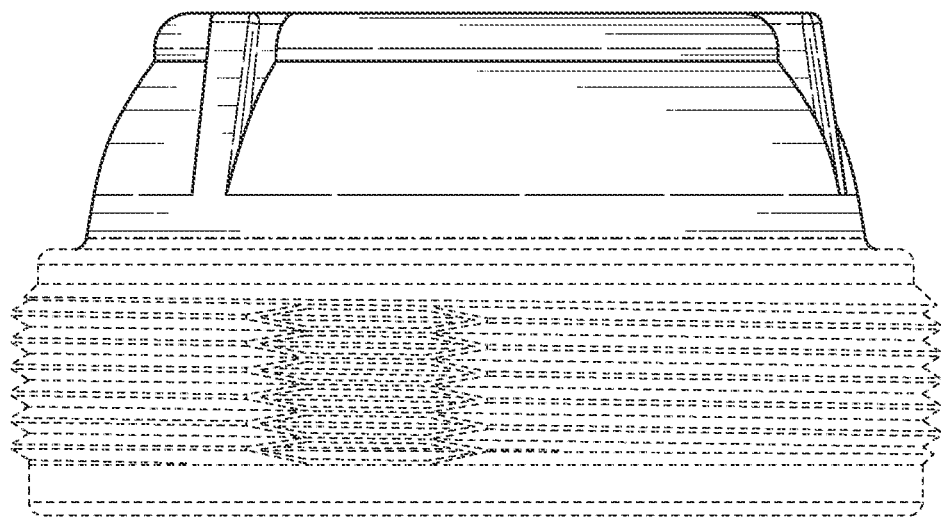
FIG. 13 is a bottom plan view of a camera lens barrel in accordance with one or more embodiments of the present disclosure.
Figure 14:
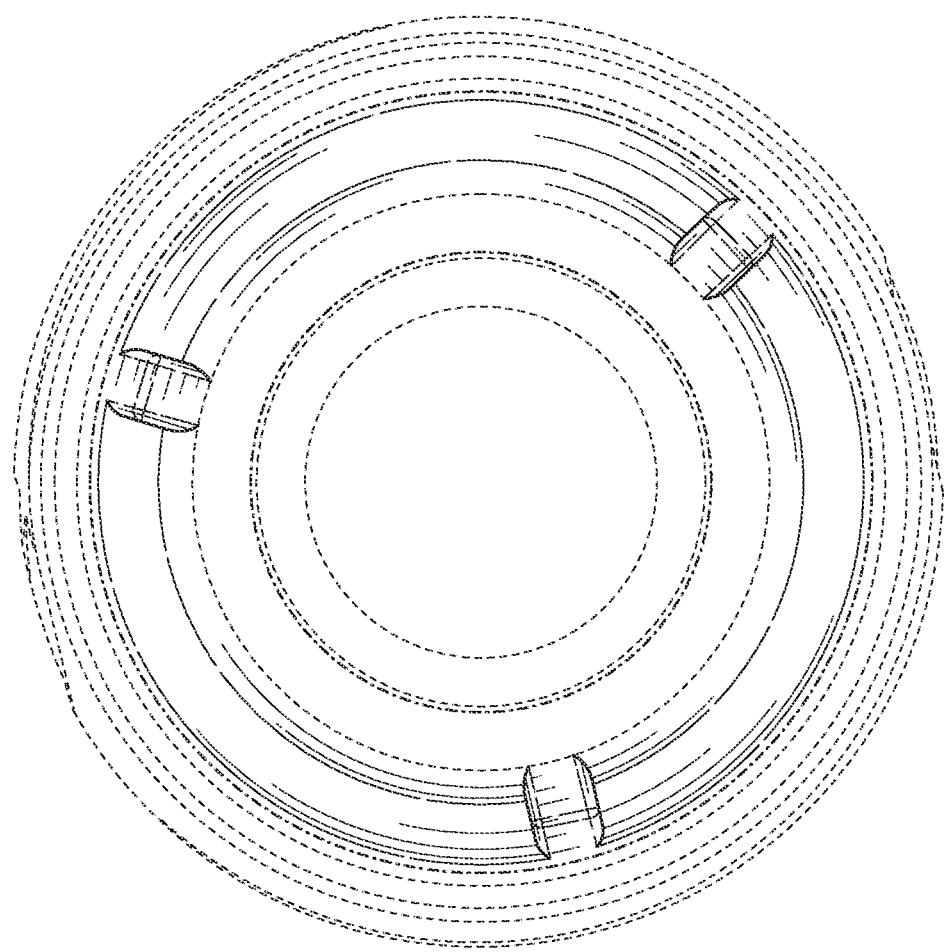
FIG. 14 is a front elevational view of a camera lens barrel in accordance with one or more embodiments of the present disclosure.
Figure 15:
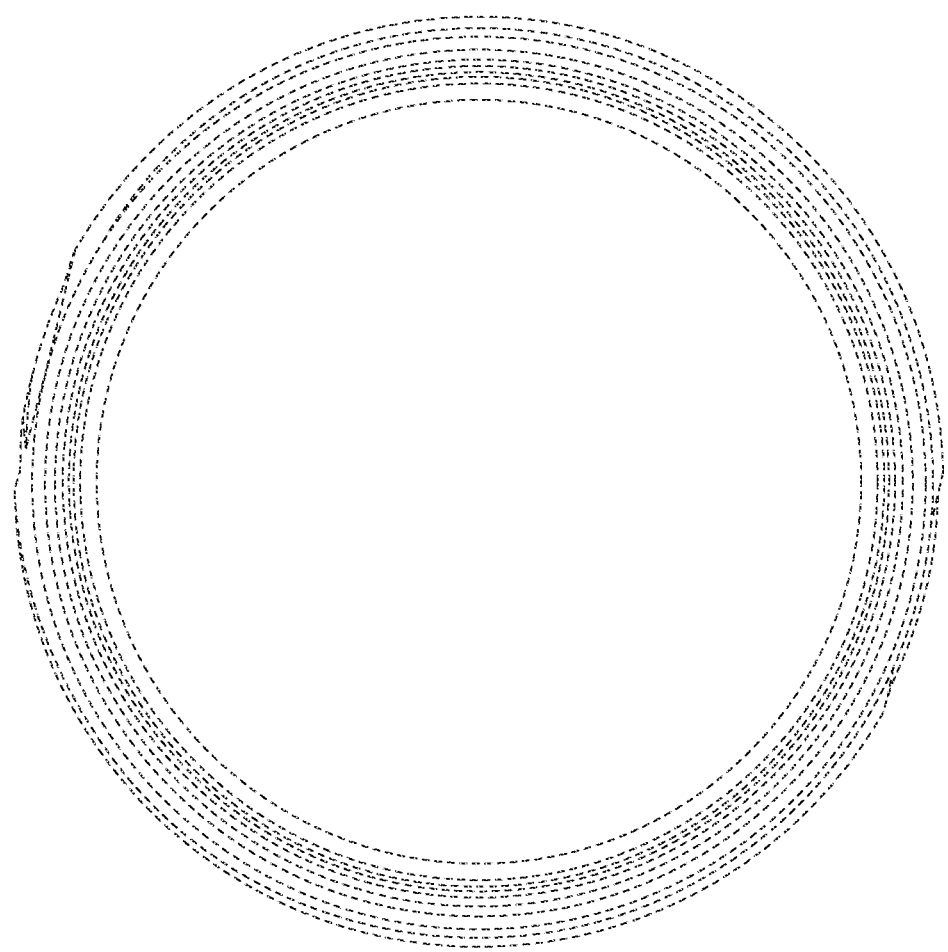
FIG. 15 is a rear elevational view of a camera lens barrel in accordance with one or more embodiments of the present disclosure.
Figure 16:
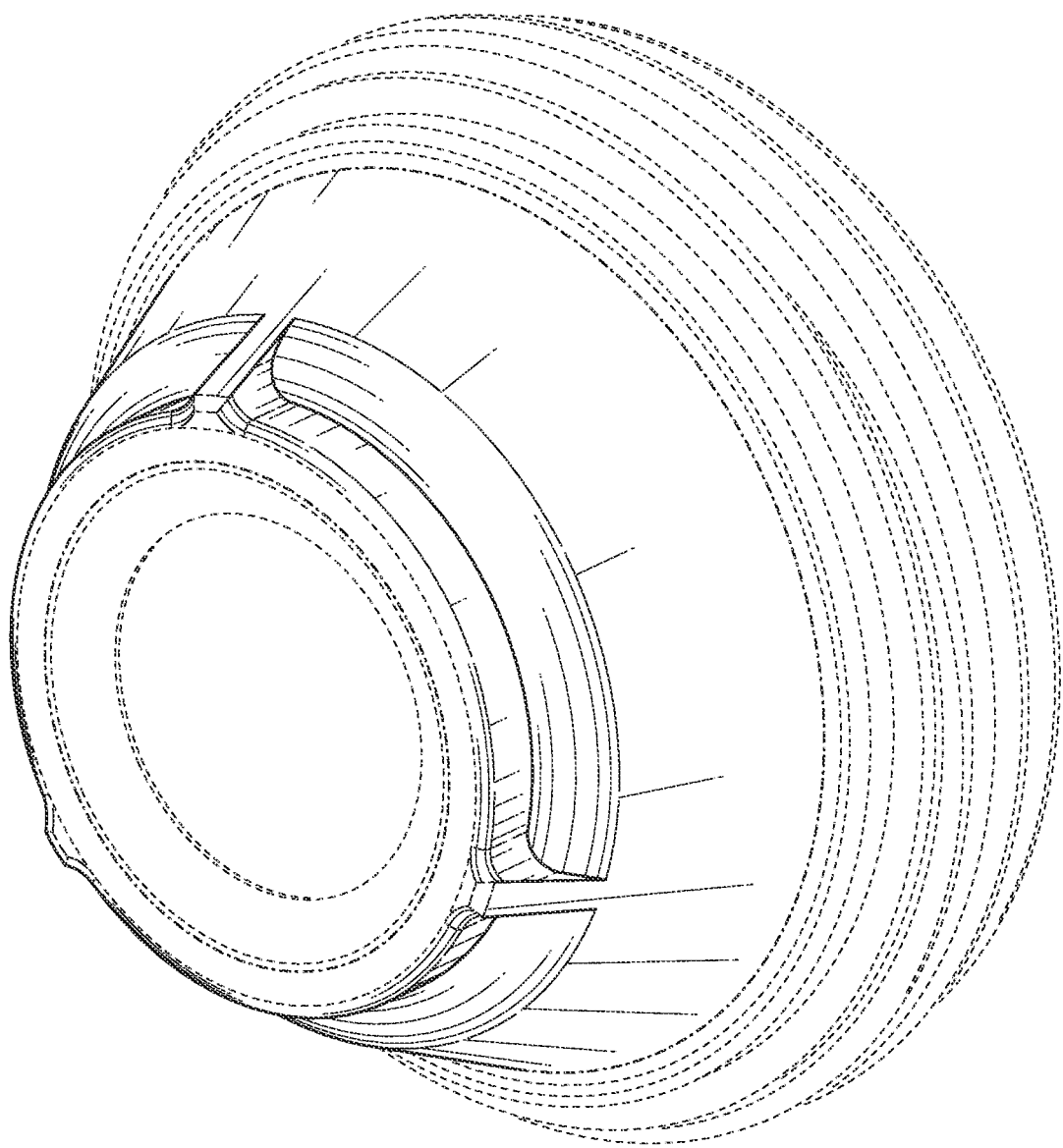
FIG. 16 is a front, left, and top perspective view of a camera lens barrel in accordance with one or more embodiments of the present disclosure.
Figure 17:
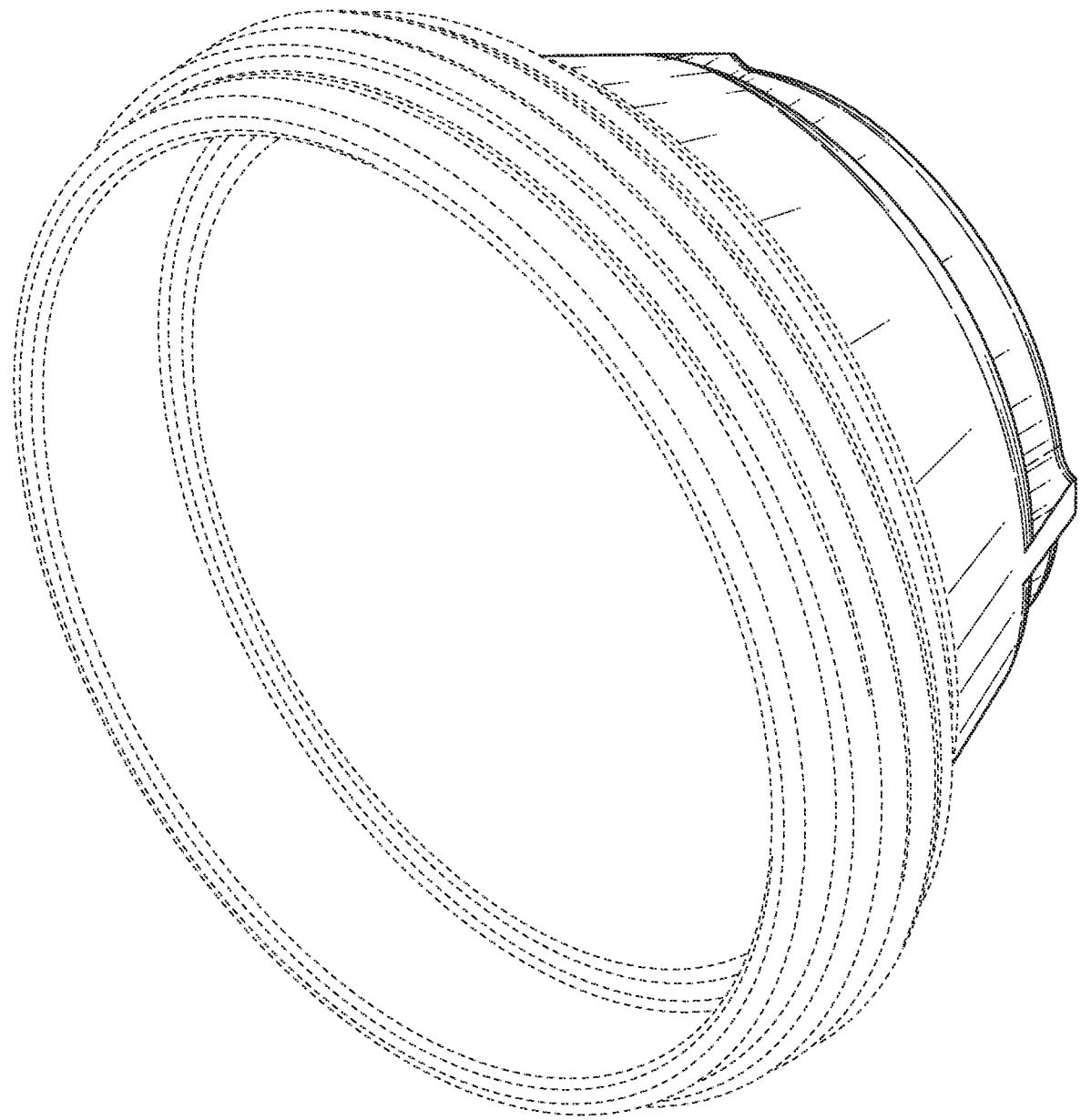
FIG. 17 is a rear, right, and top perspective view of a camera lens barrel in accordance with one or more embodiments of the present disclosure.
Figure 18:
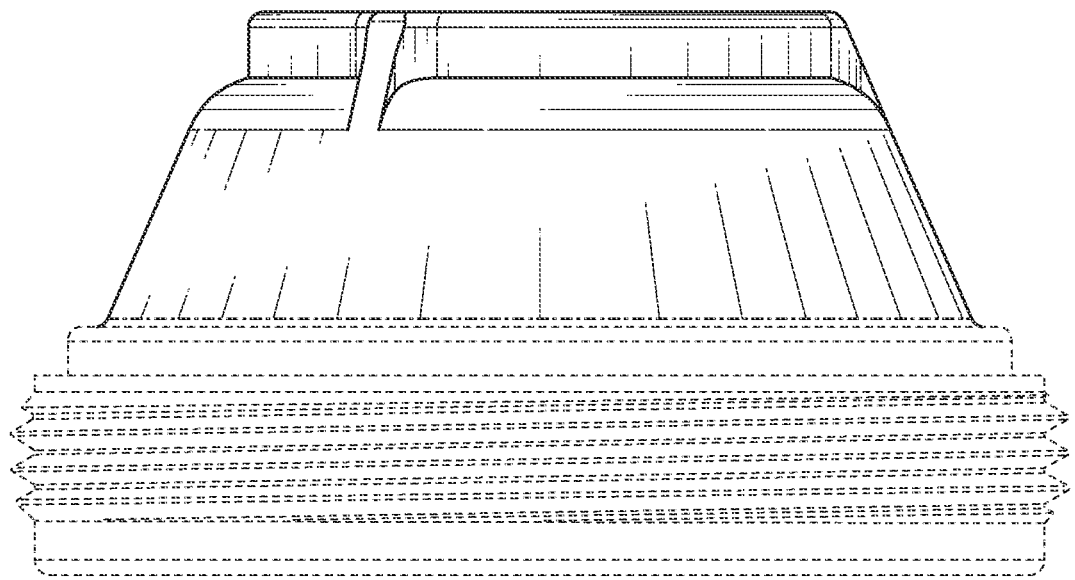
FIG. 18 is a right side elevational view of a camera lens barrel in accordance with one or more embodiments of the present disclosure.
Figure 19:
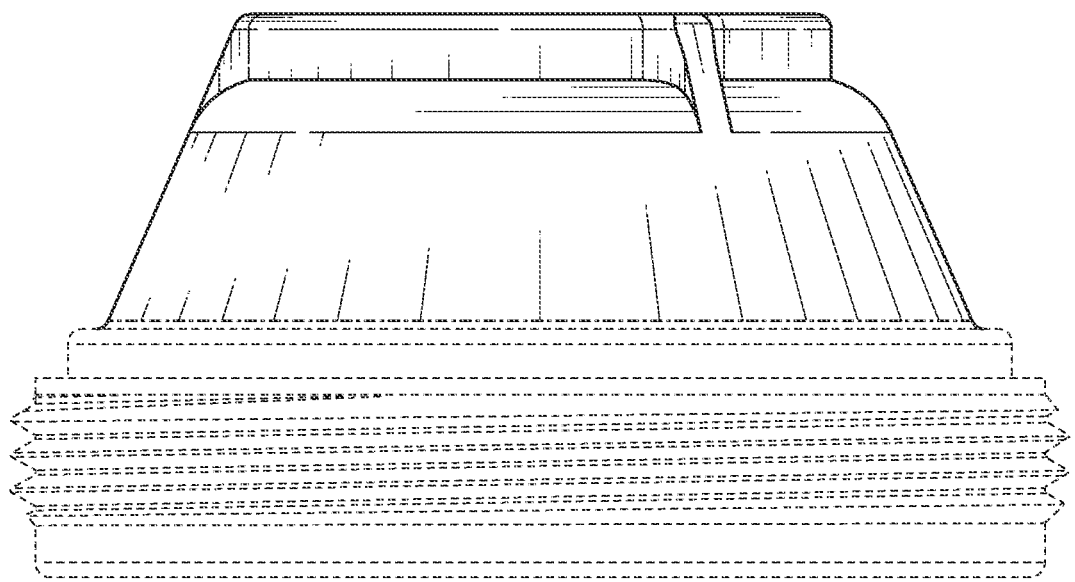
FIG. 19 is a left side elevational view of a camera lens barrel in accordance with one or more embodiments of the present disclosure.
Figure 20:
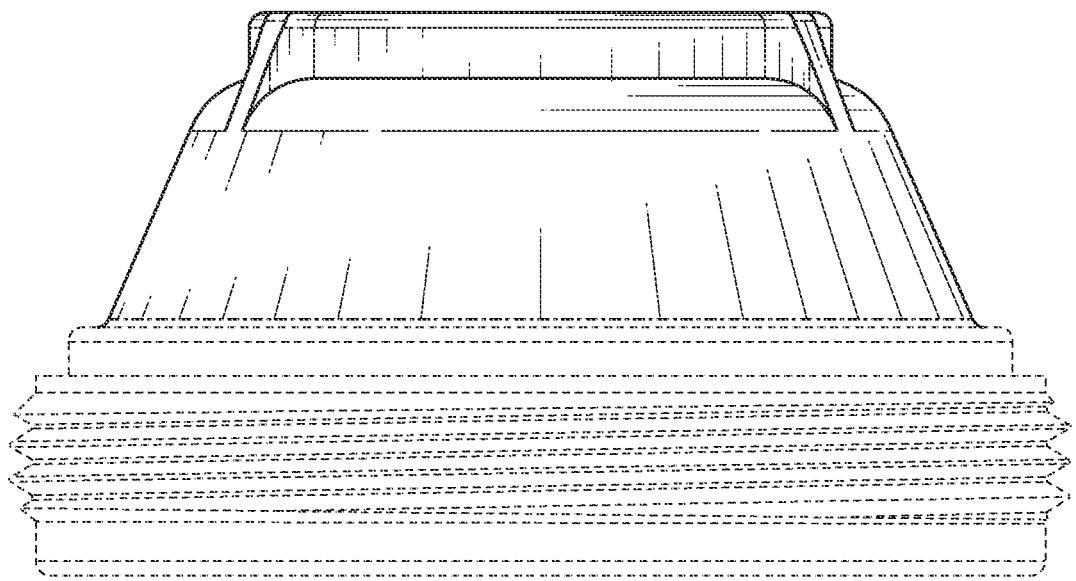
FIG. 20 is a top plan view of a camera lens barrel in accordance with one or more embodiments of the present disclosure.
Figure 21:
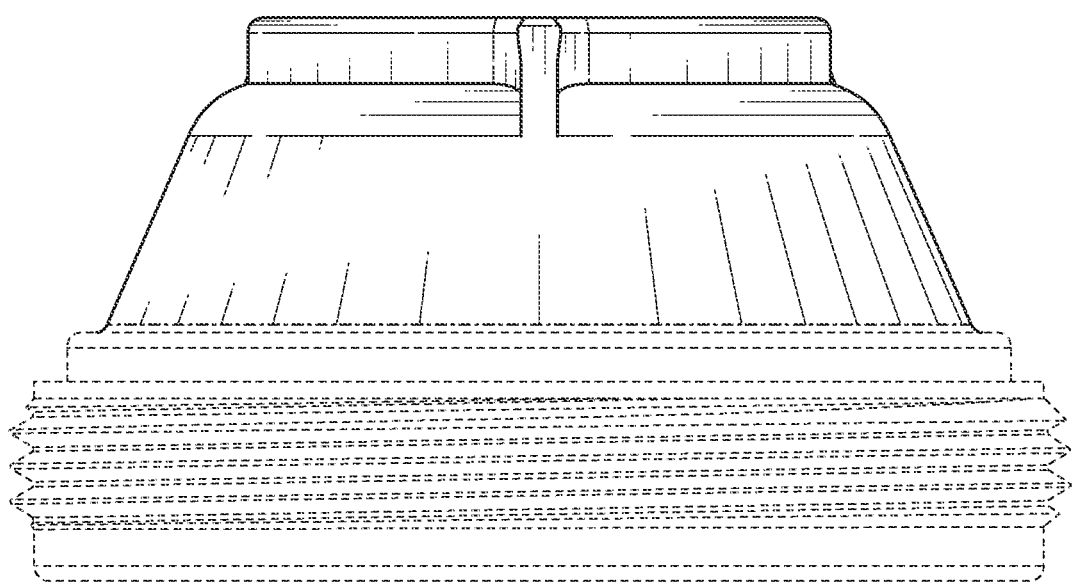
FIG. 21 is a bottom plan view of a camera lens barrel in accordance with one or more embodiments of the present disclosure.
Figure 22:
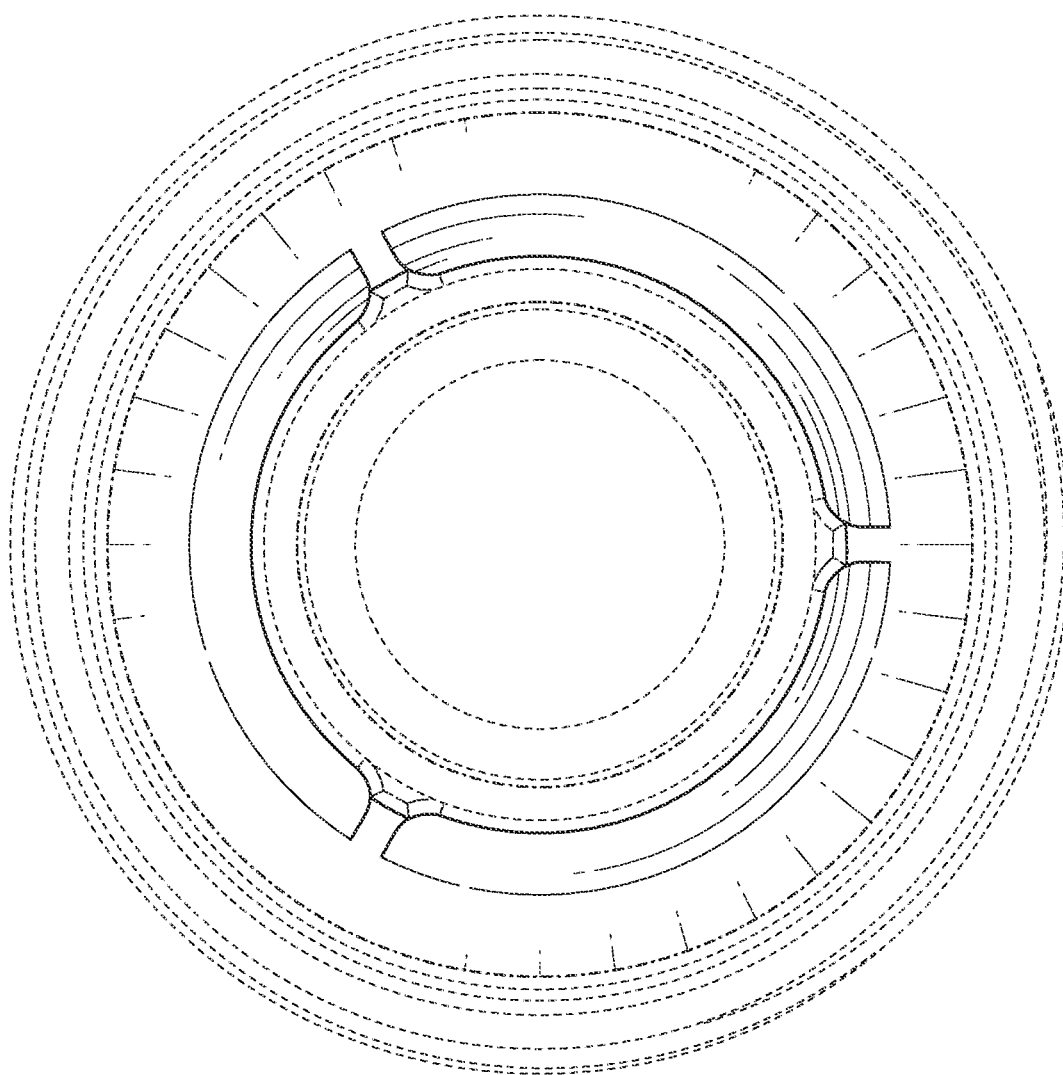
FIG. 22 is a front elevational view of a camera lens barrel in accordance with one or more embodiments of the present disclosure.
Figure 23:
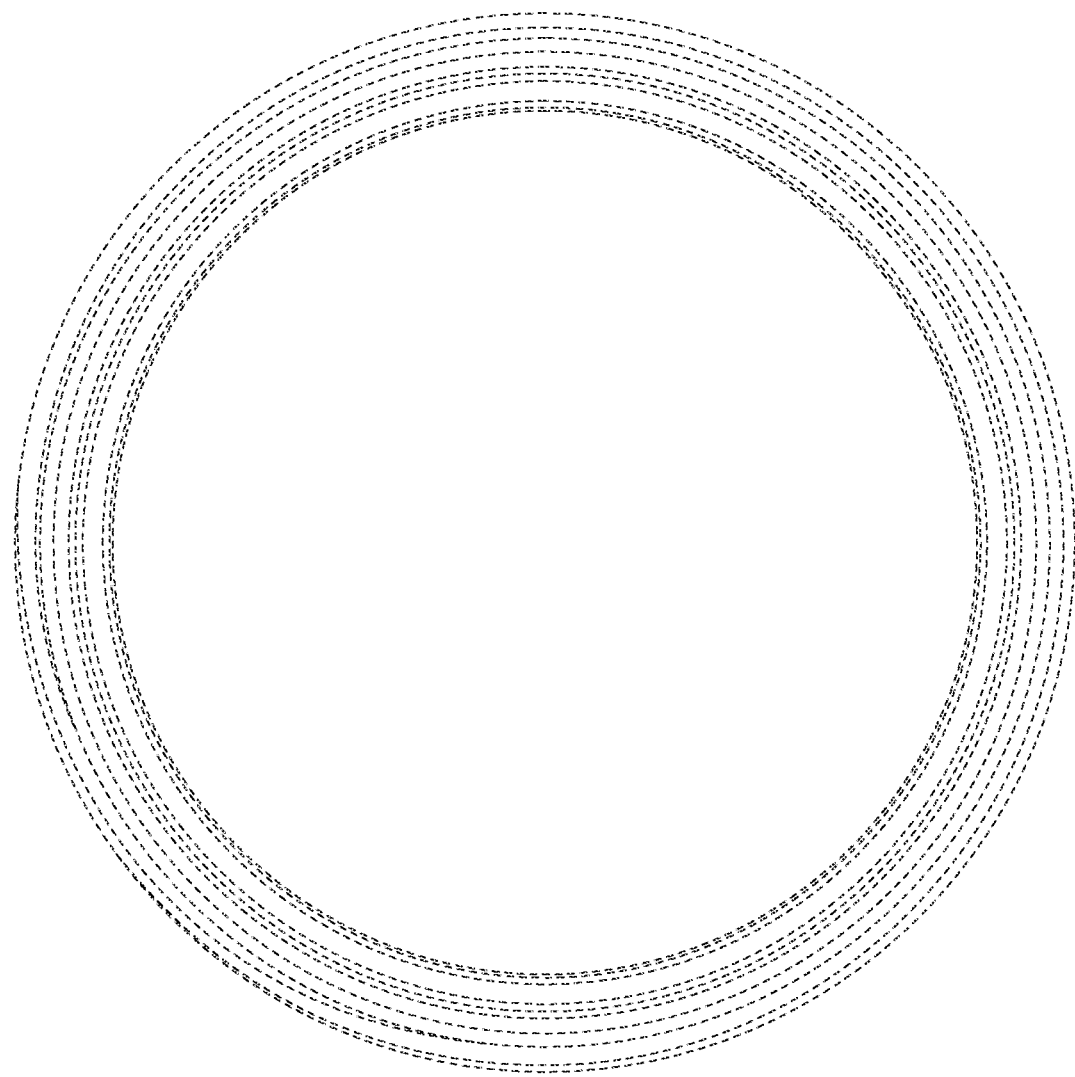
FIG. 23 is a rear elevational view of a camera lens barrel in accordance with one or more embodiments of the present disclosure.

FIG. 7 illustrates a flow diagram of an example process 700 for using an imaging device in accordance with one or more embodiments of the present disclosure. For explanatory purposes, the example process 700 is primarily described herein with reference to components of FIG. 5 and associated arrangement of these components. However, the example process 700 is not limited to the components of FIG. 5.

At block 705, a lens system including the lens elements 505A and 505B receives electromagnetic radiation and directs the electromagnetic radiation to the detector array 510. At block 710, the detector array 510 receives the electromagnetic radiation from the lens system. At block 715, the detector array 510 generates an image based on the electromagnetic radiation. In some aspects, the lens system may be appropriate to transmit thermal infrared radiation and the image generated by the detector array 510 may be a thermal infrared image. In some cases, the image generated by the detector array 510 may be provided for processing, storage, and/or display. For example, the image may be provided to a processor for processing to remove distortion in the image, and the processed image may then be provided for storage, display, and/or further processing.

FIGS. 8 through 23 illustrate various views of a camera lens barrel in accordance with one or more embodiments of the present disclosure. In an embodiment, the camera lens barrel may be the lens barrel 300 of FIGS. 3 and 4. The camera lens barrel as shown in FIGS. 8 through 23 includes focusing pins, body portions associated with different widths, and a threaded interface portion (e.g., for mating with a housing).

Although the foregoing provides a two lens system, one lens element or more than two lens elements may be utilized. In some cases, each additional lens element provided in the system allows more degrees of freedom with regard to characteristics (e.g., shape such as curvature, size) defined for each of the lens elements to achieve a desired performance. A fewer number of lens elements is generally associated with a smaller size associated with the optical system. For instance, manufacturing limitations may constrain a maximum curvature that can be manufactured for a given lens element.

It is noted that dimensional aspects provided above are examples and that other values for the dimensions can be utilized in accordance with one or more implementations. Furthermore, the dimensional aspects provided above are generally nominal values. As would be appreciated by a person skilled in the art, each dimensional aspect has a tolerance associated with the dimensional aspect. Similarly, aspects related to distances between features also have associated tolerances.

Where applicable, various embodiments provided by the present disclosure can be implemented using hardware, software, or combinations of hardware and software. Also where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice versa.

Software in accordance with the present disclosure, such as non-transitory instructions, program code, and/or data, can be stored on one or more non-transitory machine readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

The foregoing description is not intended to limit the present disclosure to the precise forms or particular fields of use disclosed. Embodiments described above illustrate but do not limit the invention. It is contemplated that various alternate embodiments and/or modifications to the present invention, whether explicitly described or implied herein, are possible in light of the disclosure. Accordingly, the scope of the invention is defined only by the following claims.

What is claimed is:

1. An imaging device comprising:
 a lens barrel having an optical axis, the lens barrel comprising:
  a body having a height that extends along the optical axis, wherein the body comprises a first body portion and a second body portion wider than the first body portion; and
  a plurality of focusing fins disposed on an external side surface of the body, wherein each focusing fin extends perpendicular to the optical axis and outwards from the first body portion and the second body portion, wherein each focusing fin extends at least partially along the height of the body;
 a lens system disposed within the lens barrel and configured to receive electromagnetic radiation and direct the electromagnetic radiation, wherein each focusing fin of the plurality of focusing fins is configured to be engaged with a torque tool to adjust a focus of the lens system; and
 a detector array comprising a plurality of detectors, wherein each of the plurality of detectors is configured to receive the electromagnetic radiation from the lens system and generate an image based on the electromagnetic radiation.

2. The imaging device of claim 1, wherein each focusing fin of the plurality of focusing fins comprises a top portion and a bottom portion wider than the top portion, wherein the top portion of the plurality of focusing fins extends outwards from the first body portion and the bottom portion of the plurality of focusing fins extends outwards from the second body portion, the top portion and the bottom portion of the focusing fins each comprise a height that is substantially the same as the height of each of the first body portion and the second body portion, respectively, and wherein the plurality of focusing fins comprises three focusing fins.

3. The imaging device of claim 2, wherein the three focusing fins are substantially evenly distributed along a circumference of the body.

4. The imaging device of claim 1, wherein:
 the lens system is disposed at least partially within the second body portion.

5. The imaging device of claim 1, wherein the lens system comprises:
 a first lens element configured to receive the electromagnetic radiation and transmit the electromagnetic radiation; and
 a second lens element adjacent to the first lens element and configured to receive the electromagnetic radiation and direct the electromagnetic radiation to the detector array.

6. The imaging device of claim 1, wherein the electromagnetic radiation comprises mid-wave infrared light and/or long-wave infrared light.

7. The imaging device of claim 1, further comprising:
 a processor configured to process the image to obtain a processed image; and
 a housing, wherein the detector array comprises an array of microbolometers, and wherein the lens barrel is coupled to the housing.

8. The imaging device of claim 7, wherein the body further comprises an interface portion, and wherein the interface portion is mated with the housing.

9. The imaging device of claim 8, wherein the interface portion is mated with the housing via threads of the interface portion.

10. A method of manufacturing the imaging device of claim 7, the method comprising:
 providing the detector array;
 disposing the lens system at least partially within the lens barrel; and disposing the detector array and the lens barrel within the housing.

11. A vehicle comprising the imaging device of claim 1.

12. A method for providing imaging functionality to a vehicle comprising the imaging device of claim 1, the method comprising:
mounting the imaging device onto the vehicle; and
operating the imaging device to generate thermal images.

13. The imaging device of claim 1, wherein the body and the plurality of focusing fins are integrally formed.

14. A method comprising:
receiving, by a lens system disposed within a lens barrel having an optical axis and comprising a body and a plurality of focusing fins extending from the body, electromagnetic radiation associated with a scene, wherein the body, which includes a height that extends along the optical axis, comprises a first body portion and a second body portion wider than the first body portion, and wherein each focusing fin is disposed on an external side surface of the body and extends outwards from the first body portion and the second body portion wherein each focusing fin extends at least partially along the height of the body, wherein each focusing fin extends perpendicular to the optical axis, wherein each focusing fin of the plurality of focusing fins is configured to be engaged with a torque tool to adjust a focus of the lens system;
directing, by the lens system, the electromagnetic radiation to a detector array;
receiving, by the detector array, the electromagnetic radiation; and
generating, by the detector array, an image based on the electromagnetic radiation.

15. The method of claim 14, wherein the electromagnetic radiation comprises mid-wave infrared light and/or long-wave infrared light.

16. The method of claim 14, further comprising adjusting the focus of the lens system by engaging one or more of the plurality of focusing fins with the torque tool.

17. The method of claim 14, wherein the plurality of focusing fins comprises three focusing fins.

18. The method of claim 17, wherein the three focusing fins are substantially evenly distributed along a circumference of the body.

19. The method of claim 14, wherein:
the lens system is disposed at least partially within the second body portion.

20. The method of claim 14, wherein the body and the plurality of focusing fins are integrally formed.

* * * * *